US008885606B2

(12) United States Patent
Jung et al.

(10) Patent No.: US 8,885,606 B2
(45) Date of Patent: Nov. 11, 2014

(54) APPARATUS AND METHOD FOR UPDATING CONTROL INFORMATION OF A TARGET BASE STATION DURING HANDOVER OPERATION IN A BROADBAND WIRELESS COMMUNICATION SYSTEM

(75) Inventors: Inuk Jung, Anyang-si (KR); Kiseon Ryu, Anyang-si (KR); Jinsam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 115 days.

(21) Appl. No.: 13/521,213

(22) PCT Filed: Feb. 9, 2011

(86) PCT No.: PCT/KR2011/000875
§ 371 (c)(1),
(2), (4) Date: Dec. 27, 2012

(87) PCT Pub. No.: WO2011/099775
PCT Pub. Date: Aug. 18, 2011

(65) Prior Publication Data
US 2013/0090118 A1 Apr. 11, 2013

Related U.S. Application Data

(60) Provisional application No. 61/302,555, filed on Feb. 9, 2010, provisional application No. 61/307,408, filed on Feb. 23, 2010, provisional application No. 61/308,282, filed on Feb. 25, 2010, provisional application No. 61/310,722, filed on Mar. 5, 2010, provisional application No. 61/361,929, filed on Jul. 7, 2010.

(30) Foreign Application Priority Data

Feb. 9, 2011 (KR) .................... 10-2011-0011438

(51) Int. Cl.
*H04W 4/00* (2009.01)
*H04W 36/00* (2009.01)
(52) U.S. Cl.
CPC ...... *H04W 36/0005* (2013.01); *H04W 36/0083* (2013.01)

USPC ........................................... 370/331; 455/436
(58) Field of Classification Search
CPC .................................................. H04W 36/0005
USPC ........................................... 370/331; 455/436
See application file for complete search history.

(56) References Cited

U.S. PATENT DOCUMENTS

2005/0059437 A1  3/2005 Son et al.
2007/0054667 A1  3/2007 Lee et al.
(Continued)

FOREIGN PATENT DOCUMENTS

CN  1951035     4/2007
CN  101048956   10/2007
(Continued)

OTHER PUBLICATIONS

In the Korean Intellectual Property Office Application Serial No. 10-2011-0011438, Notice of Allowance dated Oct. 22, 2012, 2 pages.

(Continued)

*Primary Examiner* — Wei Zhao
(74) *Attorney, Agent, or Firm* — Lee, Hong, Degerman, Kang & Waimey

(57) ABSTRACT

An operation method of a terminal for updating control information of a target base station in a handover procedure. The method may include receiving a neighbor advertisement message comprising control information of at least one neighbor base station comprising the target base station from the serving base station; transmitting a handover request message comprising first change count information indicating a neighbor advertisement message version to the serving base station; receiving a handover command message comprising delta control information different from the control information included in the neighbor advertisement message from the serving base station; and updating the control information of the target base station using the received delta control information.

10 Claims, 5 Drawing Sheets

(56) References Cited

U.S. PATENT DOCUMENTS

| | | |
|---|---|---|
| 2008/0139207 A1* | 6/2008 | Son et al. ............... 455/437 |
| 2009/0196254 A1* | 8/2009 | Cha et al. ............... 370/331 |
| 2009/0291686 A1* | 11/2009 | Alpert et al. ............ 455/436 |

FOREIGN PATENT DOCUMENTS

| | | |
|---|---|---|
| JP | 2002-010348 | 1/2002 |
| JP | 2009-049614 | 3/2009 |
| JP | 2009081547 | 4/2009 |
| KR | 10-2006-0107292 | 10/2006 |
| WO | 2008-114137 | 9/2008 |
| WO | 2009-022951 | 2/2009 |
| WO | 2009/091188 | 7/2009 |

OTHER PUBLICATIONS

Inuk Jung et al., "802.16m Superframe Aligned MAC Layer Handover Procedures", IEEE 802.16 Broadband Wireless Access Working Group, IEEE C802.16m_08/796, Jul. 2008.

The State Intellectual Property Office of the People's Republic of China Application U.S. Appl. No. 201180008506 .1 Office Action dated Jul. 29, 2014, 8 pages.

* cited by examiner

APPARATUS AND METHOD FOR UPDATING CONTROL INFORMATION OF A TARGET BASE STATION DURING HANDOVER OPERATION IN A BROADBAND WIRELESS COMMUNICATION SYSTEM

CROSS-REFERENCE TO RELATED APPLICATIONS

This application is the National Stage under 35 U.S.C. 371 of International Application No. PCT/KR2011/000875, filed on Feb. 9, 2011, which claims the benefiet of earlier filing date and right of priority to Korean Application No. 10-2011-0011438, filed on Feb. 9, 2011, and also claims the benefit of U.S. Provisional Application Ser. No. 61/361,929, filed on Jul. 7, 2010, U.S. Provisional Application Ser. No. 61/310,722, filed on Mar. 5, 2010, U.S. Provisional Application Ser. No. 61/308,282, filed on Feb. 25, 2010, U.S. Provisional Application Ser. No. 61/307,408, filed on Feb. 23, 2010, and U.S. Provisional Application Ser. No. 61/302,555, filed on Feb. 9, 2010, the contents of which are all incorporated by reference herein in their entirety.

TECHNICAL FIELD

The present disclosure relates to a broadband wireless access system, and more particularly, to an apparatus for effectively acquiring system information (or control information) of a target base station while performing a handover operation.

BACKGROUND ART

Handover (HO) refers to an operation in which a terminal moves from the wireless interface of a base station to the wireless interface of another base station. Hereinafter, a handover procedure in a typical IEEE 802.16e system will be described.

In an IEEE 802.16e network, a serving base station (SBS) may broadcast neighbor base station information through a neighbor advertisement (MOB_NBR-ADV) message to notify information (topology) on a basic network configuration to a mobile station (hereinafter, referred to as a "terminal").

The MOB_NBR-ADV message may include system information on a serving base station and neighbor base stations, for example, preamble index, frequency, handover (HD) optimization capability, downlink channel descriptor (DCD)/uplink channel descriptor (UCD), and the like.

the DCD/UCD may include information that the terminal should know to perform information correspondence through uplink and downlink. For example, there are information such as handover (HD) trigger, medium access control (MAC) version of a base station, and media independent handover (MIH) capability.

More specifically, DCD includes downlink burst profiles (DL_Burst_Profiles), which are information for allowing a terminal to decode messages transmitted by a base station. All terminals within the coverage of the relevant base station are preferably able to receive messages broadcasted by the base station, and thus a DL_Burst_Profile setting value that is most robust to an error will be applied, and therefore, it rarely occurs when the setting value is changed. However, a message transmitted in unicast to each terminal sends a suitable setting value adapted to the channel state of a terminal, and thus the DL_Burst_Profile setting value during unicast may be different for each terminal. UCD includes UL_Burst_Profiles, which are information for allowing a terminal to send messages to the relevant base station.

As described above, system information in a typical IEEE 802.16e system may be transferred through UCD in uplink and DCD in downlink, and may have a maximum transmission period of 10 seconds. At this time, when system information is updated, the base station does not allow the system information of the relevant base station possessed by a terminal through scheduling to be mismatched so that all terminals may recognize the updated system information at least once. For this purpose, in case of UCD, the period of a UCD transition interval start and a UCD transition interval expired is defined, and the base station is supposed to transmit new UCD at that period.

A procedure in which the terminal that has acquired the system information of the neighbor base station through the foregoing method performs handover in an IEEE 802.16e network will be described in more detail.

A handover procedure in a typical IEEE 802.16e network may include three processes, such as handover (HO) initiation & preparation, handover (HO) execution, and handover (HO) completion.

An example of the basic handover procedure having the foregoing configuration will be described with reference to FIG. 1.

FIG. 1 illustrates an example of a handover procedure that can be carried out in an IEEE 802.16e system.

Referring to FIG. 1, first, a mobile station (MS) may be connected to a serving base station (SBS) to perform data exchange (S101).

The serving base station may periodically broadcast information on a neighbor base station in which the serving base station itself is located (S102).

While corresponding with the serving base station, the terminal may start to scan candidate base stations (candidate HO BSs) using a handover (HO) trigger condition. Under a handover condition, for example, when exceeding a predetermined hysteresis margin value, the terminal may transmit a handover request (MOB_MSHO-REQ) message to the serving base station to make a request for performing a handover procedure (S103).

The serving base station may notify a handover request of the terminal to the candidate base stations (candidate HO BSs) included in the MOB_MSHO-REQ message through a HO-REQ message (S104).

The candidate base stations (candidate HO BSs) may take preliminary measures for the terminal that has requested handover and transfer information associated with handover to the serving base station through a HO-RSP message (S105).

The serving base station may transfer information associated with handover that has been acquired through the HO-RSP message from the candidate base stations to the terminal through a handover response (MOB_BSHO-RSP) message. Here, the MOB_BSHO-RSP message may include information for performing handover, such as an action time for handover, a handover identifier (HO-ID), a dedicated handover (HO) CDMA ranging code, and the like (S106).

The terminal may determine one target base station among the candidate base stations based on information included in the MOB_BSHO-RSP message received from the serving base station. Accordingly, the terminal may transmit a CDMA code to the determined target base station to attempt ranging (S107).

The target base station that has received a CDMA code may transmit the success or failure of the ranging and physical compensation values through a ranging response (RNG-RSP) message to the terminal (S108).

Next, the terminal may transmit a ranging request (RNG-REQ) message for authentication to the target base station (S109).

The target base station that has received the terminal's ranging request message may provide system-2 information that can be used in the relevant base station, such as a connection identifier (CID), to the terminal through a ranging response message (S110).

If the target base station has successfully completed the authentication of a terminal and sent all update information, then the success or failure of handover may be notified to the serving base station of the terminal through a handover complete message (HO-CMPT) (S111).

Subsequently, the terminal may perform information exchange with the target base station that has performed handover (S112).

In an IEEE 802.16m system, there is a modification in the name and/or function of each medium access control (MAC) management in the foregoing handover procedure.

The handover procedure that can be carried out in an IEEE 802.16m system is similar to the handover procedure in an IEEE 802.16e system as described above. However, there is a modification in the name and/or function of each medium access control (MAC) management as follows.

MOB_NBR-ADV AAI_NBR-ADV: The relevant message includes system information transferred not in a DCD/UCD form but in an S-SFH form.

MSHO-REQ→AAI_HO-REQ
BSHO-RSP→AAI_HO-CMD
RNG-REQ (CDMA code)→Ranging preamble code
RNG-RSP (ranging status)→AAI_RNG-ACK (ranging status)
RNG-REQ (MAC message)→AAI_RNG-[0031] REQ
RNG-RSP→AAI_RNG-RSP: The relevant message includes TSTID or ATID, which is a station identifier, instead of CID.

Furthermore, in an IEEE 802.16m system, the system information of a base station is transmitted through a superframe head.

Hereinafter, the frame structure and superframe header of an IEEE 802.16m system will be described.

FIG. 2 illustrates an example of a physical frame structure used in a wireless metropolitan area network (MAN) mobile communication system on the basis of an IEEE 802.16 system.

Referring to FIG. 2, a superframe may have a length of 20 ms, and may include four frames.

One frame may include eight subframes again, and the eight subframes may be classified into a downlink subframe region and an uplink subframe region including a predetermined number of subframes according to a ratio of downlink and uplink (DL/UL ratio). In case where the uplink/downlink (UL/DL) ratio is 5:3 as illustrated in FIG. 2, five of the eight subframes are allocated to downlink subframes (SF0 through SF4), and the remaining three are allocated to uplink subframes (SF5 through SF7).

Between the downlink subframe region and the uplink subframe region, there exists an idle time, namely, a transmit/receive transition gap (TTG) to which data symbols (i.e., valid symbols) including data are not allocated. Furthermore, there may also exist an idle time, namely, a transmit/receive transition gap (TUG) subsequent to the downlink subframe region. Furthermore, one subframe may include six OFDM symbols again.

Using the foregoing frame structure, the base station and terminal may perform data exchange. For example, the terminal may receive data from the base station through a downlink subframe and transmit data to the base station through an uplink subframe. Furthermore, the base station may transmit data to the terminal through a downlink subframe and receive data from the terminal through an uplink subframe.

On the other hand, in the foregoing frame structure, a superframe header may be transmitted to the terminal through a first subframe of the superframe. The subframe header may include resource allocation information, system information, or the like in the frame or subframe unit included in the superframe header.

More specifically, in an IEEE 802.16m system, a superframe header (hereinafter, referred to as "SFH") may include essential system parameters, system configuration information, and the like.

The superframe header may be divided into a primary superframe header (P-SFH) and a secondary superframe header (S-SFH). P-SFH transmitted for each superframe may include the least significant 4 bits (4 bit-LSB) information of the superframe number and information in association with S-SFH transmitted from the relevant superframe. The S-SFH transfers actual system information, and the system information is divided into subpackets according to its properties, which are referred to as S-SFH SPn (n=1, 2, 3). Each S-SFH SP IE is transmitted with different transmission periods (TSP1<TSP2<TSP3), respectively. Here, the system information are setting values according to the communication environment, such as ranging, power control, and the like, which are required for the terminal to perform downlink/uplink (DL/UL) transmission.

The information associated with S-SFH included in P-SFH may include an S-SFH change count indicating an S-SFH version currently being transmitted, an S-SFH scheduling information bit-map indicating whether S-SFH is transmitted in the relevant superframe, an S-SFH size indicating the number of logical resource units (LRUs) allocated for S-SFH transmission, an S-SFH number of repetitions indicating the transmission format of S-SFH, an S-SFH subpacket (SP) change bitmap indicating which S-SFH SP has been changed, and the like. At this time, the size of the S-SFH scheduling information bit-map and S-SFH subpacket (SP) change bit-map field is same as a total SP number of SSFH included in the relevant superframe.

When the terminal wants to perform handover to a specific target base station, it may cause a difference in the handover delay time according to whether or not the superframe header (SFH) information of the target base station possessed by the terminal is the latest. If handover is carried out in a state that SFH of the target base station has been received through a neighbor advertisement (AAI_NBR-ADV) message, then the target base station may perform network re-entry to complete handover.

However, the terminal may not have received a neighbor advertisement (AAI_NBR-ADV) message including SFH of the target base station, or may receive an AAI_NBR-ADV message in which a change of the SFH of the target base station has not yet been reflected. The terminal performing handover in this state receives all SFHs from the target base station and then performs network re-entry. In other words, it means that the handover delay time increases as much as the time required for the terminal to receive all S-SFH SP1/2/3, and additionally, the terminal cannot perform a handover (HO) optimized procedure such as dedicate ranging or seamless handover (HO) using a dedicated ranging code.

In other words, if the terminal does not receive any part of target base station SFH or receives SFH directly from the target base station while performing handover in a state of not having the latest information, the handover delay time may be greatly increased. Due to this, the minimum handover delay time defined by the standard may not be satisfied.

DISCLOSURE OF INVENTION

Solution to Problem

The present invention is contrived to solve the foregoing general problems, and an aspect of the present disclosure is to provide an effective handover performing method, and an apparatus for performing the same.

Another aspect of the present disclosure is to provide a method in which a terminal that does not have the latest system information of the target base station effectively acquires the system information of the target base station during a handover performing procedure, and an apparatus therefor.

Still another aspect of the present disclosure is to provide a method for a timing of applying the latest system information received by a terminal when receiving the latest system information of the target base station, and an apparatus therefor.

Technical problems to be solved in the present invention are not limited to the above-described problems and other technical problems, which are not mentioned, will definitely be understood by those skilled in the art from the following description.

According to the present disclosure, there is disclosed an operation method of a terminal for updating control information (SFH) of a target base station in a handover procedure, and the method may include receiving a neighbor advertisement message including control information of at least one neighbor base station including the target base station from the serving base station; transmitting a handover request message including first change count information indicating a neighbor advertisement message version to the serving base station; receiving a handover command message including delta control information different from the control information included in the neighbor advertisement message from the serving base station; and updating the control information of the target base station using the received delta control information.

Furthermore, it is characterized in that the handover command message may further include second change count information indicating a neighbor advertisement message version possessed by the serving base station, and the delta control information is included in the handover command message when the first change count information is different from the second change count information.

Furthermore, it is characterized in that the handover command message may further include application indication information of the delta control information.

Furthermore, it is characterized in that the application indication information of the delta control information may be information indicating whether delta control information received from the serving base station is applied when performing a network re-entry procedure to the target base station.

Furthermore, it is characterized in that the handover command message may further include application timing information of the delta control information.

Furthermore, it is characterized in that the application timing information of the delta control information may indicate a time offset from a frame number in which the handover command message is transmitted when the terminal applies the delta control information when performing a network re-entry procedure to the target base station.

Furthermore, it is characterized in that the control information may be a superframe header.

Furthermore, it is characterized in that the method may further include transmitting a ranging request message to the target base station using the updated control information; and receiving a ranging response message from the target base station.

Furthermore, according to the present disclosure, there is disclosed an operation method of a terminal for updating control information (SFH) of a target base station in a handover procedure, and it is characterized in that the method may include receiving a handover command message including first change count information indicating a neighbor advertisement message version from the serving base station; checking whether the received first change count information is matched to second change count information possessed by the terminal; and transmitting a handover indication message including an event code indicating handover command cancel requested by the serving base station to the serving base station when not matched as a result of the check.

Furthermore, it is characterized in that the method may further include receiving a first message including the latest version control information of the target base station from the serving base station; and updating control information currently possessed by the terminal as the latest version control information.

Furthermore, it is characterized in that the handover indication message further may further include a control information mismatch indicator indicating that control information included in the handover command message is not the latest control information for the target base station.

Furthermore, it is characterized in that the first message may be a neighbor advertisement (NBR-ADV) message.

Furthermore, according to the present disclosure, there is disclosed a terminal for updating control information (SFH) of a target base station in a handover procedure, and it is characterized in that the terminal may include a memory; a wireless communication unit configured to transmit and/or receive wireless signals to and/or from the outside; and a controller configured to control the wireless communication unit to receive a neighbor advertisement message including control information of at least one neighbor base station including the target base station from the serving base station, and control the wireless communication unit to transmit a handover request message including first change count information indicating a neighbor advertisement message version to the serving base station, and control the wireless communication unit to receive a handover command message including delta control information different from the control information included in the neighbor advertisement message from the serving base station, and control to update the control information of the target base station using the received delta control information.

Furthermore, it is characterized in that the handover command message may further include second change count information indicating a neighbor advertisement message version possessed by the serving base station, and the controller may control such that the delta control information is included in the handover command message when the first change count information is different from the second change count information.

According to embodiments of the present disclosure, there are the following effects.

First, the terminal may more effectively perform handover.

Second, through the embodiments of the present disclosure, the terminal that does not possess the latest system information of a target base station may effectively receive the latest system information while performing handover, thereby reducing a handover delay time.

Third, through the embodiments of the present disclosure, upon receiving the latest system information of a target base station, the terminal may know a timing at which the received latest system information is applied, thereby performing a network re-entry procedure to the target base station with no delay.

MODE FOR THE INVENTION

Figure 1:
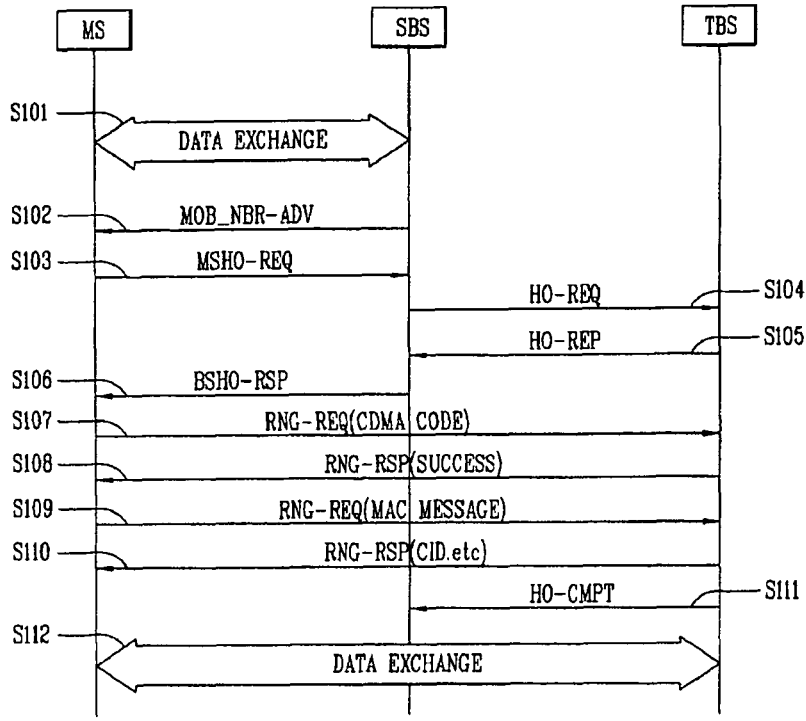
FIG. 1 illustrates an example of a handover procedure that can be performed in an IEEE 802.16e system.
Figure 2:
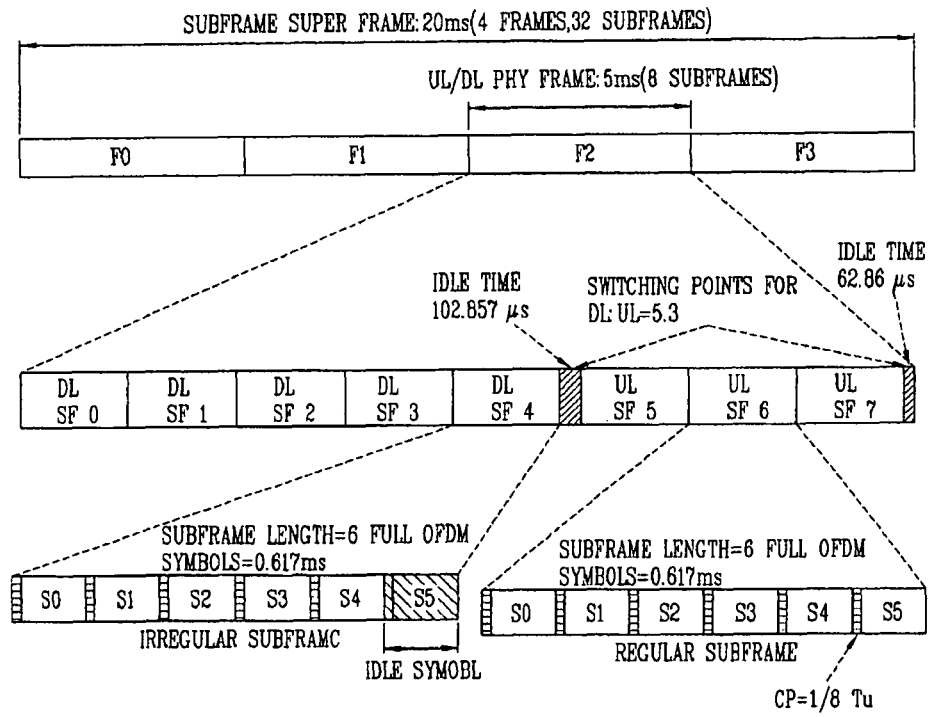
FIG. 2 illustrates an example of the physical frame structure used in a wireless metropolitan area network (MAN) mobile communication system on the basis of an IEEE 802.16 system.

In order to solve the foregoing technical problems, according to the present disclosure, there is disclosed a method capable of more effectively receiving system information of a target base station in a handover procedure, and an apparatus for performing the same.

In the following embodiments, the constituent elements and features of the present disclosure are combined with one another in a predetermined form. Each constituent element or feature thereof should be considered to be selective as unless otherwise particularly specified. Each constituent element or feature thereof may be implemented in the form of not being combined with any other constituent elements or features. Furthermore, an embodiment of the present disclosure may be also configured by combining some of the constituent elements and/or features. The sequence of the operations described in the embodiments of the present disclosure may be changed. Some of the configurations or features of any embodiment may be included in any other embodiments, or may be replaced with the configurations and features corresponding to the any other embodiments.

Embodiments of the present disclosure are described mainly in relation to the transmission and reception of data between a base station and a terminal. Here, the base station has also the meaning of a terminal node of a network, which directly performs communication with the terminal. In this disclosure, a specific operation described to be performed by a base station may be carried out by an upper node of the base station if necessary.

In other words, it should be understood that various operations carried out for communication with a terminal in a network comprised of a plurality of network nodes including a base station can be carried out by the base station or other network nodes except the base station. The term "base station" may be replaced by a term such as fixed station, Node B, eNode B (eNB), access point (AP), or the like. Furthermore, the term "terminal" may be replaced by a term such as UE (user equipment), MS (mobile station), MSS (mobile subscriber station), subscriber station (SS), or the like.

Embodiments of the present disclosure may be implemented through various means. For example, embodiments of the present disclosure may be implemented by hardware, firmware, software, or any combination thereof.

In case of a hardware implementation, a method according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In case of a firmware or software implementation, a method according to the embodiments of the present disclosure may be implemented in the form of a module, procedure, function, or the like, which performs the functions or operations as described above. The software codes may be stored in a memory unit to be driven by a processor. The memory unit may be located at an inner or outer portion of the processor to send and/or receive data to and/or from the processor by various publicly-known means.

The embodiments of the present invention may be supported by standard documents disclosed in at least one of an IEEE 802.16 system, a 3GPP system, a 3GPP LTE system, and 3GPP3 system, which are wireless access systems. In other words, the steps or portions not described herein to clearly disclose the technical spirit of the present invention among the embodiments of the present invention may be supported by the documents.

Specific terms used herein are provided to help understanding of the present disclosure, and the use of those specific terms may be replaced with other terms without departing from the technical spirit of the present disclosure.

As described above, the terminal is required to acquire the system information of a target base station when performing handover. Examples of the system information of the target base station may include uplink/downlink resource configuration, uplink frequency reuse ratio, power control, ranging channel information, advanced map (A-MAP) information, feedback (HARQ) information, backoff information, and the like.

The foregoing system information may be acquired by the terminal through a superframe header (SFH) of the target base station or a neighbor advertisement (AAI_NBR-ADV) message broadcasted by the serving base station.

However, it may happen that the terminal has an older version of SFH than that of a current SFH of the neighbor base station. It is a problem that can happen since a transmission period of the neighbor advertisement message is relatively longer than that of the superframe header. Such a state may be referred to as a situation in which a superframe header (SFH) is mismatched to a specific base station.

The situations in which a SFH mismatch happens may include 1) when the terminal does not receive the latest neighbor advertisement (AAI_NBR-ADV) message reflecting SFH update, 2) when the terminal performs handover to a target base station before an AAI_NBR-ADV message reflecting SFH update is broadcasted, or the like.

In case where such a SFH mismatch happens, the method of updating target base station SFH information of a terminal proposed by the present invention may be largely divided into two cases.

Firstly, it is a case when the terminal initiates handover, and secondly, it is a case when the base station initiates handover.

First, a case when the terminal initiates handover (MS initiated HO) will be described.

According to an embodiment of the present disclosure, there is provided a method capable of effectively receiving the latest system information of a target base station in a handover procedure initiated by the terminal itself in a SFH mismatch state.

When the terminal initiates handover, the method of updating SFH mismatched to a target base station according to an embodiment of the present disclosure may be largely divided into three types as follows.

1. A method of transmitting mismatched SFH delta value information to the terminal through a handover command (AAI_HO-CMD) message within the handover procedure;

2. A method of allowing the serving base station (Serving ABS, S-ABS) to coordinate an entry before break (EBB) handover procedure for directly updating SFH in the target base station while performing a handover procedure; and 3. A method of allowing the serving base station (S-ABS) to reject a terminal-initiated handover procedure.

First Embodiment

1. First, a first method will be described.

According to an aspect of the present embodiment, it is proposed that current neighbor advertisement (AAI_NBR-ADV) change count information possessed by the terminal is included in the relevant message (AAI_HO-REQ) in case where the terminal transmits a handover request (AAI_HO-REQ) message to initiate handover.

Here, the AAI_NBR-ADV) change count means a version of the neighbor advertisement (AAI_NBR-ADV) message of a current serving base station (S-ABS). In other words, increasing the change count by 1 means that information included in the AAI_NBR-ADV message of S-ABS has been updated.

In this case, it is preferable that a field as illustrated in the following Table 1 is added to the AAI_HO-REQ message.

Table 1 illustrates an example of the field form added to a handover request (AAI_HO-REQ) message according to an embodiment of the present disclosure.

TABLE 1

| Name | Value | Usage |
|---|---|---|
| ... | ... | ... |
| Change count | AAI_NBR-ADV Change Count last received from the serving ABS | |
| ... | ... | ... |

A handover performing procedure in case where the foregoing change count information is applied will be described with reference to FIG. 3.

Figure 3:
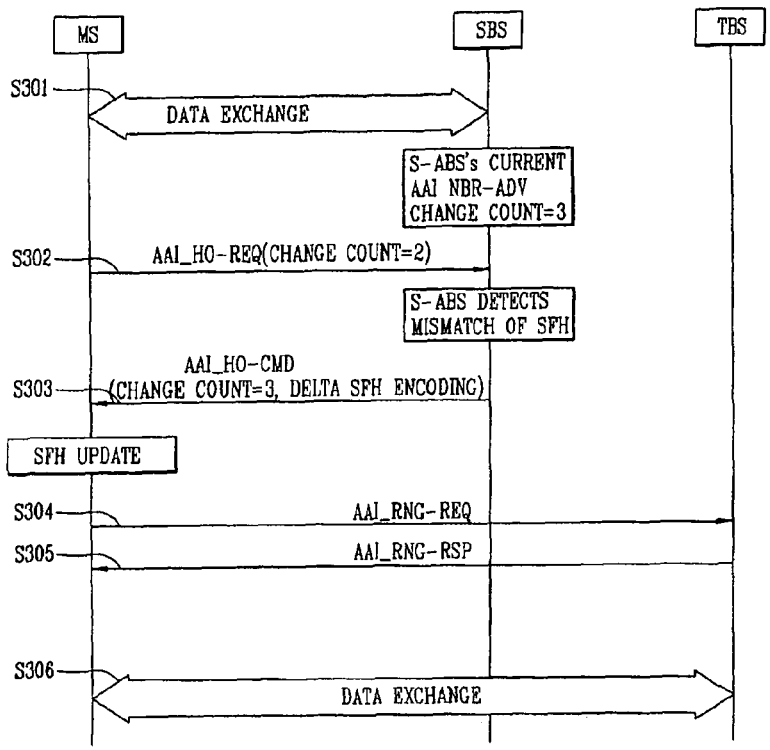
FIG. 3 illustrates an example of the procedure of updating system information of a target base station in a handover procedure according to an embodiment of the present invention.

FIG. 3 illustrates an example of the procedure of updating system information in a handover procedure according to an embodiment of the present invention.

Referring to FIG. 3, first, the terminal may normally perform data exchange with the serving base station and receive a neighbor advertisement (AAI_NBR-ADV) message including the system information of the neighbor base station from the serving base station (S301).

Here, it is assumed that a change count value of the neighbor advertisement message is 2. Subsequently, the system information is updated in the serving base station, and the change count value of the neighbor advertisement message is changed to 3.

If a predetermined handover condition is satisfied, then the terminal sets neighbor advertisement change count information to 2 to initiate handover and transmits a handover request (AAI_HO-REQ) message to the serving base station (S302).

The base station that has received a handover request message of the terminal may know that SFH mismatch has been occurred in the neighbor advertisement message information possessed by the terminal. Accordingly, the base station transmits a handover command (AAI_HO-CMD) message to the terminal by setting a change count value to 3 therein and including an SFH delta value according to version change in the neighbor advertisement message (S303).

Accordingly, the terminal may acquire the latest system information of a target base station using an SFH delta value included in the handover command message, and then transmit a ranging request (AAI_RNG-REQ) message to the target base station (S304).

The target base station may transmit a ranging response (AAI_RNG-RSP) message in response to the ranging request message transmitted by the terminal (S305).

Subsequently, the terminal and base station successfully complete a handover procedure to normally perform data exchange (S306).

Second Embodiment

2. Next, a second method will be described.

Even in another aspect of the present embodiment, the serving base station determines an SFH mismatch state of the terminal by allowing the terminal to include neighbor advertisement change count information in the handover request message. However, it is proposed that the terminal receives mismatched SFH information directly from the target base station not through a handover command message but through entry before break (EBB) handover.

Here, the EBB handover refers to a handover re-entry mode 1 (HO_Reentry_Mode 1), which is a method of maintaining the connection with a serving base station until prior to entering the target base station during the handover procedure to perform data exchange, having an effect of reducing an interruption time.

For this purpose, the serving base station (S-ABS) may coordinate an EBB handover procedure to allow the terminal to receive mismatched SFH information directly from the target base station. More specifically, the terminal updates SFH in the target base station (T-ABS) during an interval in which an exchange is not performed with the serving base station (HO_Reentry_Interleaving_Interval) according to the scheduling of the serving base station, and continuously receives services from S-ABS. The serving base station may transmit a handover command (AAI_HO-CMD) message to the terminal by including at least one of information indicating the scheduling periodicity information (SP scheduling periodicity information) of SFH and the mismatched state of SFH broadcasted from the target base station to support the terminal to receive only needed SFH. Based on the relevant information, the terminal may perform an EBB handover procedure.

In this case, it is preferable that a field shown in the following Table 2 is added to the handover command (AAI_HO-CMD) message.

Table 2 illustrates an example of the field form added to a handover command (AAI_HO-CMD) message according to an embodiment of the present disclosure.

TABLE 2

| Name | Value | Usage |
|---|---|---|
| ... | ... | ... |
| Mode | 0b00: HO command;<br>0b01: Zone switch command from MZone to LZone;<br>0b10: AMS HO request rejected (ABS in list unavailable). In this case, AAI_HO-CMD message shall not include any target ABS.<br>0b11: HO reject | |
| Reject Reason | 0b00: T-ABS is full<br>0b01: SFH mismatch is detected with T-ABS | In case of Mode is set to 0b11, this parameter indicates the reason of HO rejection. |
| HO_Reentry_Mode | 1: the AMS maintains communication with Serving ABS while performing network reentry with the Target ABS (Mode = 0b00); or the AMS maintains communication with MZone while performing network reentry with LZone in the same frame or on another carrier (Mode = 0b01).<br>0: the AMS disconnects from the Serving ABS before performing network reentry with the Target ABS (Mode = 0b00); or the AMS disconnects from the MZone before performing network reentry with the LZone (Mode = 0b01). | Should be included when Mode = 0b00.<br>Shall be included when Mode = 0b01. |
| HO_Reentry_Interleaving_interval | If HO Reentry Interleaving Interval >0, the AMS performs network reentry to the target ABS within the HO Reentry Interleaving Interval and continues data transmission with the Serving ABS in the remaining time.<br>If HO Reentry Interleaving Interval = 0. the AMS performs multi-carrier EBB (Established Before Break) HO procedure per 16.2.8.2.9.2.2 | Shall be included when HO Reentry Mode is set to 1 |
| HO Reentry Iteration | The requested number of iterating HO Reentry intervals by an AMS. | Shall be included when HO Reentry Interleaving Interval >0 |
| SP scheduling periodicity information | 4 bit | Indicates the scheduling periodicity of SP1, SP2 and SP3 |
| ... | ... | ... |

Referring to Table 2, the mode field may be set to a specific value (for example, "0b11") in the AAI_HO-CMD message to notify the rejection of a terminal-initiated handover request, and in this case, a reject reason field indicating rejection reason may be additionally included therein.

The field indicating such a rejection reason may be used to indicate an SFH mismatch state to the terminal. More specifically, if the reject reason field is set to a specific value (for example, "0b01"), then it may indicate that the terminal is in an SFH mismatch state. If the reject reason field is set to a different value from the SFH mismatch state, then it may indicate that the target base station can no longer accommodate the terminal.

Furthermore, SP scheduling periodicity information may be included in the AAI_HO-CMD message to notify a transmission period for each S-SFH SP to the terminal.

An SFH update procedure through the foregoing EBB will be described with reference to FIG. 4.

Figure 4:
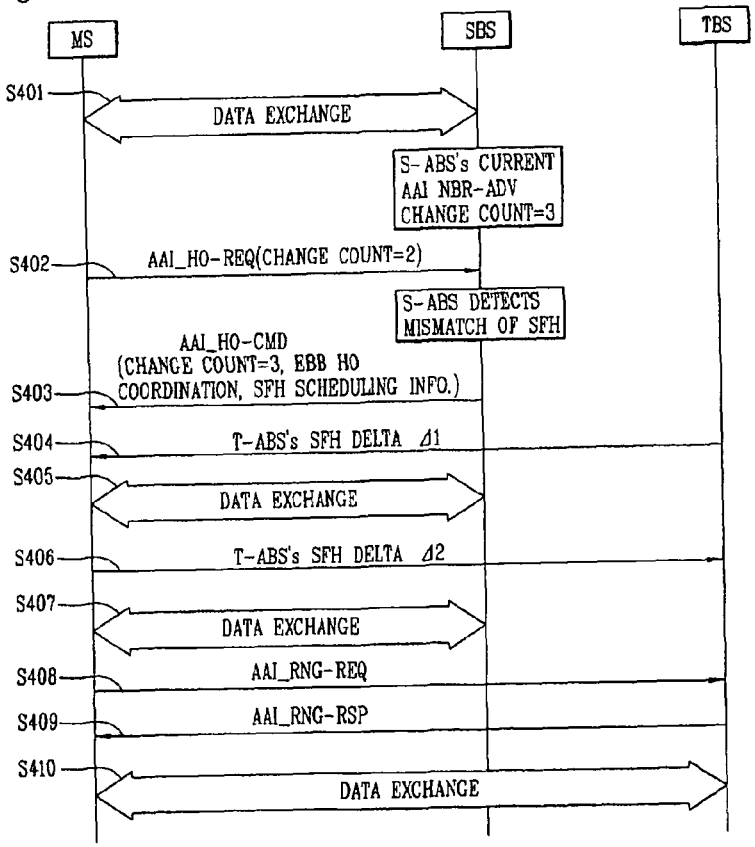
FIG. 4 illustrates an example of the procedure of updating system information of a target base station through EBB handover according to an embodiment of the present invention.

FIG. 4 illustrates an example of the procedure of acquiring system information of a target base station through EBB handover according to an embodiment of the present invention.

Referring to FIG. 4, first, the terminal may normally perform data exchange with the serving base station and receive a neighbor advertisement (AAI_NBR-ADV) message including the system information of the neighbor base station from the serving base station (S401).

Here, it is assumed that a change count value of the neighbor advertisement message is 2. Subsequently, the system information of the neighbor base station (namely, SFH) is updated by the serving base station, and the change count value of the neighbor advertisement message is changed to 3.

If a predetermined handover condition is satisfied, then the terminal sets neighbor advertisement change count information to 2 to initiate handover and transmits a handover request (AAI_HO-REQ) message to the serving base station (S402).

The base station that has received a handover request message of the terminal may know that SFH mismatch has been occurred in the neighbor advertisement message information possessed by the terminal, and accordingly, coordinate EBB handover in the terminal. To this end, the serving base station may transmit a handover command (AAI_HO-CMD) message to the terminal by including at least one of a change count value set to 3, information indicating SFH mismatch or non-mismatch, and EBB handover coordination information notifying to the terminal that the serving base station coordinates EBB handover (S403).

Here, the EBB handover coordination information may include information on an interval in which an exchange is not performed with the serving base station according to the scheduling of the serving base station, namely, information on handover re-entry interleaving interval (HO_Reentry_Interleaving_Interval). Furthermore, the serving base station may additionally include SFH scheduling information indicating a timing at which mismatched SFH information is transmitted from the target base station in the handover command message.

The terminal that has received the handover command message may know an SFH mismatch state, and may receive mismatched SFH information (SFH delta 1) directly from the target base station during the handover re-entry interleaving interval using the information included in the handover command message (S404).

If the SFH scheduling information of the target base station is included in the handover command message, then the terminal may perform the reception of SFH by further referring to this at the step of S404.

When it is not in the handover re-entry interleaving interval, the terminal may perform data exchange with the serving base station according to the scheduling of the base station (S405).

If there is mismatched SFH information even subsequent to the reception of SFH carried out in the step of S404, then the terminal may additionally receive SFH (SFH delta 2) of the target base station during the next handover re-entry interleaving interval, and may perform data exchange with the serving base station according to the scheduling of the base station subsequent to the relevant interval (S406, S407).

Subsequently, upon acquiring the latest system information of the target base station through the reception of SFH, the terminal may transmit a ranging request message (S408).

The target base station may transmit a ranging response message in response to the ranging request message transmitted by the terminal (S409).

Subsequently, the terminal and base station successfully complete a handover procedure to normally perform data exchange (S410).

Third Embodiment

3. Next, a third method will be described.

Even in still another aspect of the present embodiment, the serving base station determines an SFH mismatch state of the terminal by allowing the terminal to include neighbor advertisement change count information in the handover request message. However, in case where the terminal is in an SFH mismatch state, it is proposed that the serving base station rejects a handover request of the terminal to allow the terminal to receive a neighbor advertisement (AAI_NBR-ADV) message subsequently broadcasted from the serving base station. It will be described with reference to FIG. 5.

Figure 5:
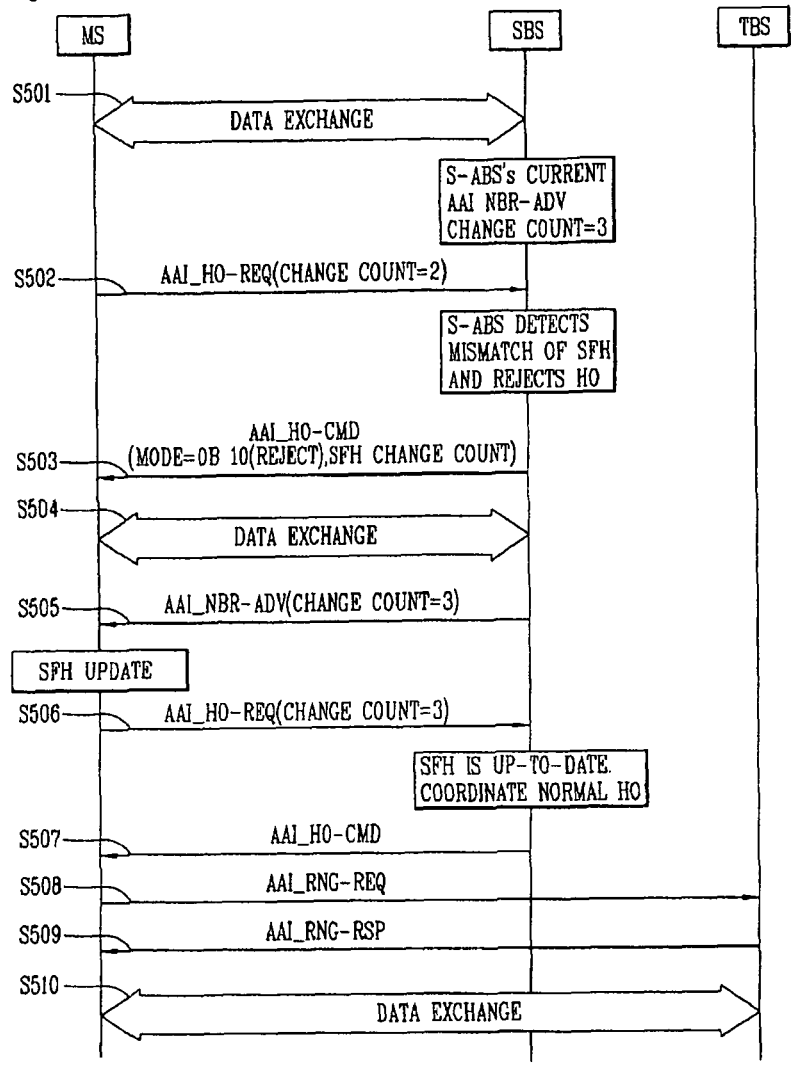
FIG. 5 illustrates an example of the procedure of updating system information of a target base station through a neighbor advertisement message in a handover procedure according to an embodiment of the present invention.

FIG. 5 illustrates an example of the procedure of updating system information of a target base station through a neighbor advertisement message in a handover procedure according to an embodiment of the present invention.

Referring to FIG. 5, first, the terminal may normally perform data exchange with the serving base station and receive a neighbor advertisement (AAI_NBR-ADV) message including the system information of the neighbor base station from the serving base station (S501).

Here, it is assumed that a change count value of the neighbor advertisement message is 2. Subsequently, the system information (SFH) of the neighbor base station is updated in the serving base station, and the change count value of the neighbor advertisement message is changed to 3.

If a predetermined handover condition is satisfied, then the terminal sets neighbor advertisement change count information to 2 to initiate handover and transmits a handover request (AAI_HO-REQ) message to the serving base station (S502).

The base station that has received a handover request message of the terminal may know that SFH mismatch has been occurred in the neighbor advertisement message information possessed by the terminal. Accordingly, the base station may reject the handover requested by the terminal to allow the terminal to receive a subsequently transmitted AAI_NBR-ADV message. To this end, the serving base station may transmit a handover command (AAI_HO-CMD) message to the terminal by including at least one of the change count information set to 3 and mode information set to a value indicating handover rejection (for example, "0b10") therein (S503).

The terminal that has received a handover command message from the serving base station may know that handover initiated by the terminal itself is rejected as an SFH mismatch state. Accordingly, the terminal may perform data exchange with the serving base station (S504).

Subsequently, the terminal may receive the latest AAI_NBR-ADV message (change count value=3) from the serving base station (S505).

The terminal that has received the latest AAI_NBR-ADV message may acquire the latest SFH (namely, system information) of the target base station, and transmit a handover request (AAI_HO-REQ) message in which the change count value is set to 3 to the serving base station to request handover again.

The serving base station that has received a handover request message from the terminal may know that there is no SFH mismatch in the terminal, and accordingly, transmit a handover command message to the terminal (S507).

The subsequent procedure is similar to a typical handover procedure, and thus its redundant explanation will be omitted for the brevity of the specification.

Hereinafter, according to another embodiment of the present invention, a case where the base station initiates handover (BS initiated HO) will be described.

According to another embodiment of the present invention, there is provided a method capable of allowing the terminal in an SFH mismatch state to effectively receive the latest system information of the target base station in a handover procedure initiated by the serving base station.

When the serving base station initiates handover, the method of updating SFH mismatched to the target base station according to an embodiment of the present disclosure may be largely divided into two types as follows.

1. A method of allowing the terminal to perform handover after the serving base station updates all SFHs; and 2. A method of allowing the terminal to receive SFH directly from the target base station by rejecting a handover request of the serving base station and then requesting EBB handover.

Fourth Embodiment

1. First, a first method will be described.

According to an aspect of the present embodiment, it is proposed that the terminal rejects handover through a handover indication message in case where the terminal recognizes SFH mismatch when the base station transmits a handover command (AAI_HO-CMD) message with a non-request.

It will be described with reference to FIG. 6.

Figure 6:
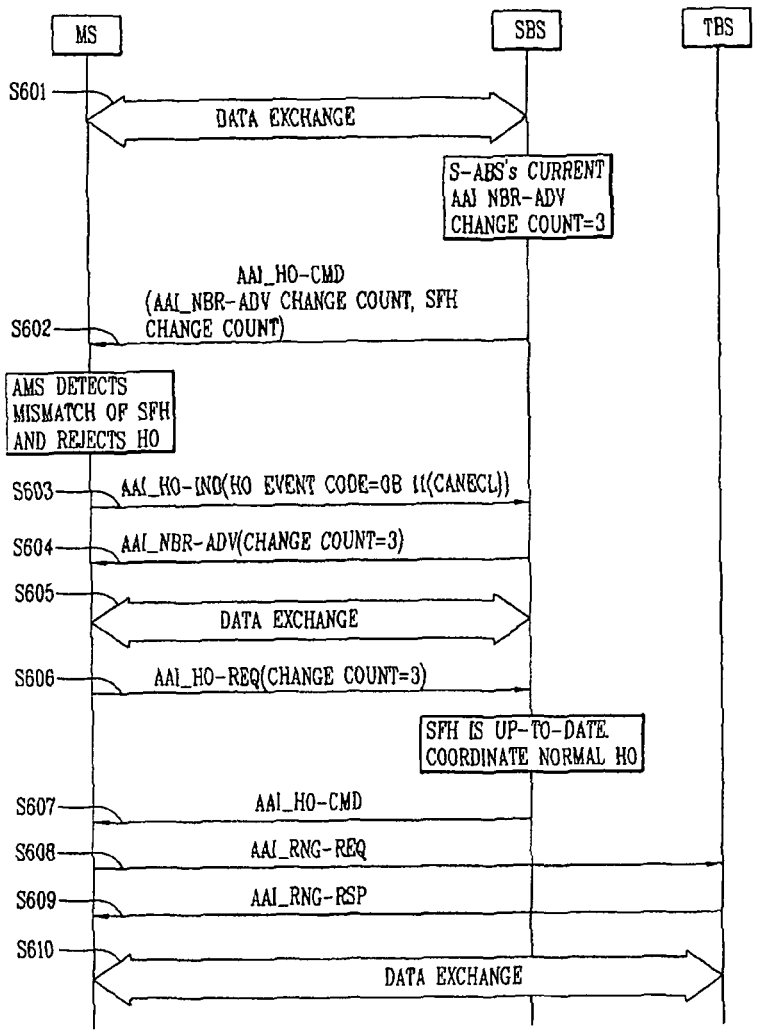
FIG. 6 illustrates an example of the procedure of updating system information of a target base station in a handover procedure according to another embodiment of the present invention.

FIG. 6 illustrates an example of the procedure of updating system information of a target base station in a handover procedure according to another embodiment of the present invention.

Referring to FIG. 6, first, the terminal may normally perform data exchange with the serving base station and receive a neighbor advertisement (AAI_NBR-ADV) message including the system information (SFH information) of the neighbor base stations from the serving base station (S601).

Here, it is assumed that a change count value of the neighbor advertisement message is 2. Subsequently, the system information (namely, SFH) of the neighbor base station is updated in the serving base station, and the change count value of the neighbor advertisement message is changed to 3.

If a predetermined handover condition is satisfied, then the serving base station sets neighbor advertisement change count information to 3 to initiate handover and transmits a handover command (AAI_HO-CMD) message to the terminal (S602).

At this time, the handover command message may further include a superframe header counter of the neighbor base station.

The terminal that has received a handover command message may know that the terminal itself is in an SFH mismatch state since the neighbor advertisement change count of the serving base station is not matched to the neighbor advertisement count of the terminal itself. Accordingly, the terminal sets an event code of the handover indication (AAI_HO-IND) message to a value indicating handover cancel or rejection to transmit to the serving base station (S603).

At this time, when the terminal rejects handover, information indicating the reason of rejection may be additionally included in the handover indication message. An example of the handover indication (AAI_HO-IND) message including the information will be described with reference to the following Table 3.

TABLE 3

| Name | Value | Usage |
| --- | --- | --- |
| HO Event Code | 0b000: Target ABS selection in case of multiple candidate T-ABSs. 0b001: All target ABSs in AAI_HO-CMD are unreachable. In this case, the AMS shall include a new target ABS that was not included in AAI_HO-CMD. 0b10: AMS unable to stay connected to serving ABS until expiration of disconnect time 0b11: HO cancel. 0b100: HO reject | This is used to distinguish AAI_HO-IND among different scenarios |
| Reject Reason | 0b00: SFH mismatch is detected with T-ABS | In case of HO Event Code is set to 0b100, this parameter indicates the reason of HO rejection. |
| ... | ... | ... |

Referring to Table 3, a value (for example, "0b100") indicating handover rejection (HO reject) may be newly established in an event code (HO event code) field in the handover indication message to reject performing a handover procedure initiated by the base station.

Furthermore, in case where the event code value is set to a value indicating handover rejection, a reject reason field indicating rejection reason may be additionally included in the handover indication message. If the reject reason field is set to a specific value (for example, "0b00"), then it may indicate that the relevant terminal is in an SFH mismatch state.

On the other hand, a change count information may be further included in the handover indication message, and in this case, it is possible to solve a problem that can happen when performing seamless handover (HO). In other words, if it is determined that the terminal has an old version of target base station system information when seamless handover is carried out, then the serving base station may cancel this to prevent an unnecessary interruption time from being occurred.

Referring to FIG. 6 again, the terminal may receive the latest neighbor advertisement message in which the change count value is set to 3 from the serving base station to update the SFH information of the neighbor base station.

Subsequently, if a predetermined handover performing condition is satisfied while performing data exchange with the serving base station, then the terminal may transmit a handover request (AAI_HO-REQ) message in which the change count value is set to 3 to the serving base station (S605, S606).

The serving base station that has received a handover request message of the terminal may know that there is no SFH mismatch in the neighbor advertisement information possessed by the terminal, and accordingly, transmit a handover command message to the terminal (S607).

The subsequent procedure is similar to a typical handover procedure, and thus its redundant explanation will be omitted.

Furthermore, in case where a neighbor advertisement change count value transmitted from the serving base station is mismatched to a neighbor advertisement change count value possessed by the terminal, the handover indication (AAI_HO-IND) may include information indicating the mismatch.

The following Table 4 illustrates an embodiment of the handover indication (AAI_HO-IND) message including information indicating neighbor advertisement change count value mismatch.

TABLE 4

| Name | Value | Usage |
| --- | --- | --- |
| HO Event Code | 0b000: Target ABS selection in case of multiple candidate T-ABSs. 0b001: All target ABSs in AAI_HO-CMD are unreachable. In this case, the AMS shall include a new target ABS that was not included in AAI_HO-CMD. 0b010: AMS unable to stay connected to serving ABS until expiration of disconnect time 0b011: HO cancel. 0b100: AAI_NBR-ADV change count mismatch indication. | This is used to distinguish AAI_HO-IND among different scenarios |
| AAI_NBR-ADV Change count | AAI_NBR-ADV change count last received from the serving ABS | This is only included when a mismatch of SFH has occurred. |

Fifth Embodiment

2. Next, a second method will be described.

Even in another aspect of the present embodiment, in case where the terminal recognizes SFH mismatch when the base station transmits a handover command (AAI_HO-CMD) message with a non-request to initiate handover, the terminal rejects handover through a handover indication message. However, in a different manner from the foregoing one aspect, it is proposed that the terminal does not acquire mismatched SFH information through a neighbor advertisement message of the serving base station but acquires it from the target base station by requesting an EBB handover procedure.

The foregoing method will be described with reference to FIG. 7.

Figure 7:
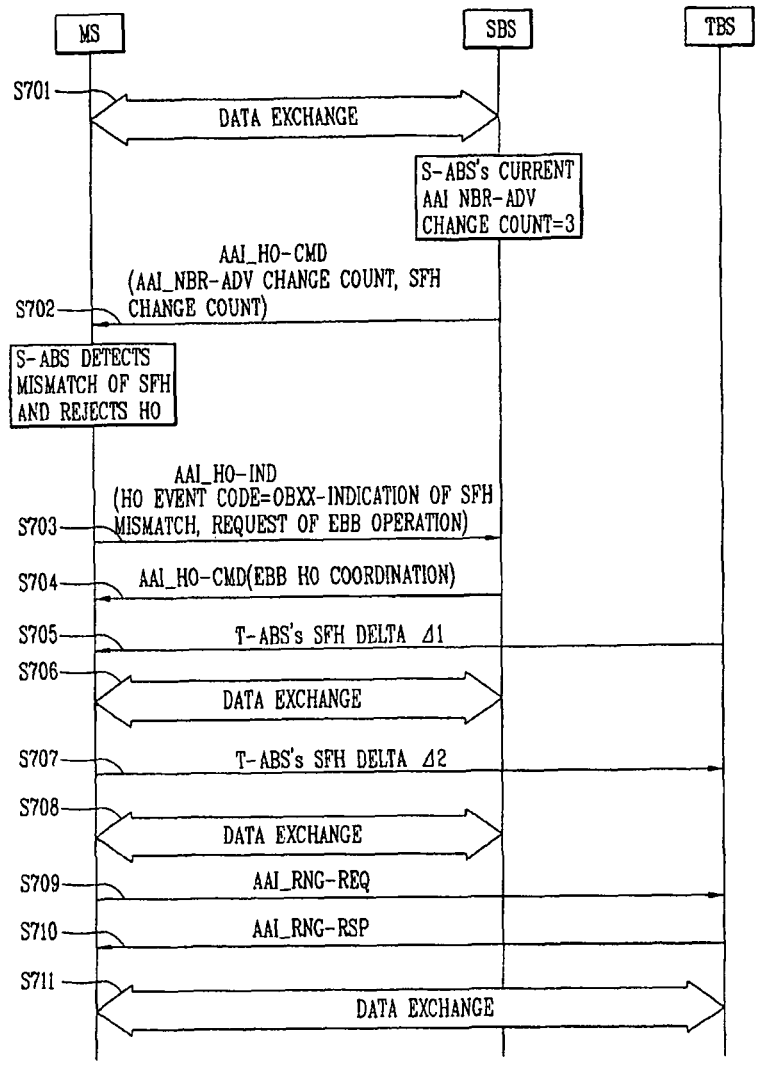
FIG. 7 illustrates another example of the procedure of updating system information of a target base station in a handover procedure according to another embodiment of the present invention.

FIG. 7 illustrates another example of the procedure of updating system information of a target base station in a handover procedure according to another embodiment of the present invention.

Referring to FIG. 7, first, the terminal may normally perform data exchange with the serving base station and receive a neighbor advertisement (AAI_NBR-ADV) message including the system information (SFH information) of the neighbor base stations from the serving base station (S701).

Here, it is assumed that a change count value of the neighbor advertisement message is 2. Subsequently, the system information (namely, SFH) of the neighbor base station is updated in the serving base station, and the change count value of the neighbor advertisement message is changed to 3.

If a predetermined handover condition is satisfied, then the serving base station sets neighbor advertisement change count information to 3 to initiate handover and transmits a handover command (AAI_HO-CMD) message to the terminal (S702).

At this time, the handover command message may further include a superframe header counter of the neighbor base station.

The terminal that has received a handover command message may know that the terminal itself is in an SFH mismatch state since the neighbor advertisement change count of the serving base station is not matched to the neighbor advertisement count of the terminal itself. Accordingly, the terminal sets an event code of the handover indication (AAI_HO-IND) message to a value (for example, any one of "0b101" through "0b111") requesting EBB handover by SFH mismatch to transmit to the serving base station (S703).

The base station that has received a handover request message of the terminal may know that SFH mismatch has been occurred in the neighbor advertisement message information possessed by the terminal. Accordingly, the base station may coordinate EBB handover in the terminal. To this end, the serving base station may transmit a handover command (AAI_HO-CMD) message to the terminal by including EBB handover coordination information notifying to the terminal that EBB handover will be coordinated therein (S704).

Here, the EBB handover coordination information may include information on an interval in which an exchange is not performed with the serving base station according to the scheduling of the serving base station, namely, information on handover re-entry interleaving interval (HO_Reentry_Interleaving_Interval). Furthermore, the serving base station may additionally include SFH scheduling information indicating a timing at which mismatched SFH information is transmitted from the target base station in the handover command message.

The terminal may receive mismatched SFH information (SFH delta 1) directly from the target base station during the handover re-entry interleaving interval using the information included in the handover command message (S705).

If the SFH scheduling information of the target base station is included in the handover command message, then the terminal may perform the reception of SFH by referring to this at the step of S705.

When it is not in the handover re-entry interleaving interval, the terminal may perform data exchange with the serving base station according to the scheduling of the base station (S706).

If there is mismatched SFH information even subsequent to the reception of SFH carried out in the step of S705, then the terminal may additionally receive SFH (SFH delta 2) of the target base station during the next handover re-entry interleaving interval, and may perform data exchange with the serving base station according to the scheduling of the base station subsequent to the relevant interval (S707, S708).

Subsequently, upon acquiring the latest system information of the target base station through the reception of SFH, the terminal may transmit a ranging request message (S709).

The target base station may transmit a ranging response message in response to the ranging request message transmitted by the terminal (S710).

Subsequently, the terminal and base station successfully complete a handover procedure to normally perform data exchange (S711).

On the other hand, in the foregoing embodiments, there may exist a case where the terminal acquires the latest information for S-SFH SP1 and S-SFH SP2 of the target base station during the handover procedure but SFH mismatch is occurred only in S-SFH SP3. In case where the information or the like, which is irrespective of a ranging procedure carried out in the handover process but required in a registration procedure (AAI_REG-REQ/RSP handshake), is included in the S-SFH SP3, but such information is an old version or not acquired in the terminal, ineffectiveness may happen in the latency aspect. In this case, when transmitting a ranging request message to the target base station, the terminal may include information requesting the S-SFH SP3 information in the ranging request (AAI_RNG-REQ) message. Accordingly, the target base station may transfer the S-SFH SP3 information to the terminal through a ranging response (AAI_RNG-RSP) message.

Sixth Embodiment

Hereinafter, in case where the terminal receives the latest system information (SFH) of the target base station from the serving base station, a method for a timing (when it should be applied) at which the latest system information received by the terminal is applied will be described in detail.

If the terminal does not have the latest SFH information of the target base station handed over, then the serving ABS may update the SFH information possessed by the terminal as delta SFH information through an AAI_HO-CMD message to the terminal.

However, the terminal is unaware of when the updated SFH information is applied in the target base station, and thus the terminal does not know which SFH information should be used at the time of network re-entry.

Here, for information on when SFH information will be applied, there is a parameter referred to as "SFH applying offset" within the P-SFH information, but it is not included in the neighbor advertisement (AAI_NBR-ADV) message, thereby causing such a problem.

Accordingly, a timing at which the terminal applies the latest SFH information received from the serving base station will be provided through the following methods.

1. P-SFH Information Included in AAI_NBR-ADV

The serving base station transmits a neighbor advertisement (AAI_NBR-ADV) message by including P-SFH information therein. In this case, the terminal may basically know when updated SFH information will be applied in the target base station.

In this case, the SFH information of the target base station is normally updated through an AAI_NBR-ADV message received from the serving base station, and thus the terminal applies the updated SFH information at the time of network re-entry to the target base station.

2. SFH Delta Information Apply Indicator

The terminal may know whether updated SFH information should be applied at the time of network re-entry by allowing the serving base station to transmit an AAI_HO-CMD message to the terminal by including an indicator indicating whether updated SFH information will be applied therein.

In other words, the terminal may know whether or not the latest SFH update information included in the AAI_HO-CMD message to be transmitted will be applied at the timing of network re-entry to the target ABS through an 1-bit indicator included in the AAI_HO-CMD message.

As an alternative method thereof, the serving base station may transmit an AAI_HO-CMD message to the terminal by including updated SFH information application timing information therein, thereby allowing the terminal to know the updated SFH information application timing.

Here, the updated SFH information application timing information (SFH delta information apply time offset) represents information indicating whether the serving base station will apply the updated SFH information after which number of frames from the timing at which the serving base station transmits the AAI_HO-CMD message.

In other words, the serving base station may notify the number of frames to the terminal, thereby notifying from when the terminal applies the SFH update information to be used in the target base station.

The following Table 5 illustrates an embodiment of the AAI_HO-CMD message including an SFH delta information apply indicator.

TABLE 5

| M/O | Attributes/ Array of attributes | Size (bits) | Value/Note | Conditions |
|---|---|---|---|---|
| ... | ... | ... | ... | ... |
| O | SFH delta information indicator | 1 | Indicates the presence of SFH delta information 0: SFH delta information is not included 1: SFH delta information is included | Shall be included when Mode = 0b00 |
| O | SFH delta information | Variable | Delta encoding with reference to the serving ABS. | May be included for each target ABS when Mode = 0b00 and SFH delta information is not included in the AAI_NBR-ADV message for the target ABS |
| O | SFH delta information apply indicator | 1 | Indicates whether to apply the included SFH delta information when performing network re-entry at target ABS or not. 0: AMS shall perform network re-entry at target ABS using the old SFH information 1: AMS shall perform network re-entry at target ABS using the provided SFH delta information | Shall be included when SFH delta information indicator is set to 1 |

The following Table 6 illustrates an embodiment of the AAI_HO-CMD message including an SFH delta information apply time offset.

TABLE 6

| M/O | Attributes/ Array of attributes | Size (bits) | Value/Note | Conditions |
|---|---|---|---|---|
| ... | ... | ... | ... | ... |
| O | SFH delta information indicator | 1 | Indicates the presence of SFH delta information 0: SFH delta information is not included 1: SFH delta information is included | Shall be included when Mode = 0b00 |
| O | SFH delta information | Variable | Delta encoding with reference to the serving ABS. | May be included for each target ABS when Mode = 0b00 and SFH delta information is not included in the AAI_NBR-ADV message for the target ABS |

TABLE 6-continued

| M/O | Attributes/ Array of attributes | Size (bits) | Value/Note | Conditions |
|---|---|---|---|---|
| O | SFH delta information apply time offset | 8 | The number of frames from the transmission of AAI_HO-CMD message indicates the time offset when the AMS shall apply the SFH delta information at the target ABS. | May be included for each target ABS when Mode = 0b00 and SFH delta information is not included in the AAI_NBR-ADV message for the target ABS |

Structure of a Terminal and a Base Station

Hereinafter, as a still another embodiment of the present invention, a terminal and a base station capable of performing the foregoing embodiments of the present invention will be described.

The terminal may operate as a transmitter in uplink, and operate as a receiver in downlink. Furthermore, the base station may operate as a receiver in uplink, and operate as a transmitter in downlink. In other words, the terminal and base station may include a transmitter and a receiver for transmitting information or data.

The transmitter and receiver may include a controller, a module, a portion and/or means for performing the foregoing embodiments of the present invention. In particular, the transmitter and receiver may include a module (means) for encrypting a message, a module for decrypting the encrypted message, an antenna for transmitting and receiving a message, and the like.

Figure 8:
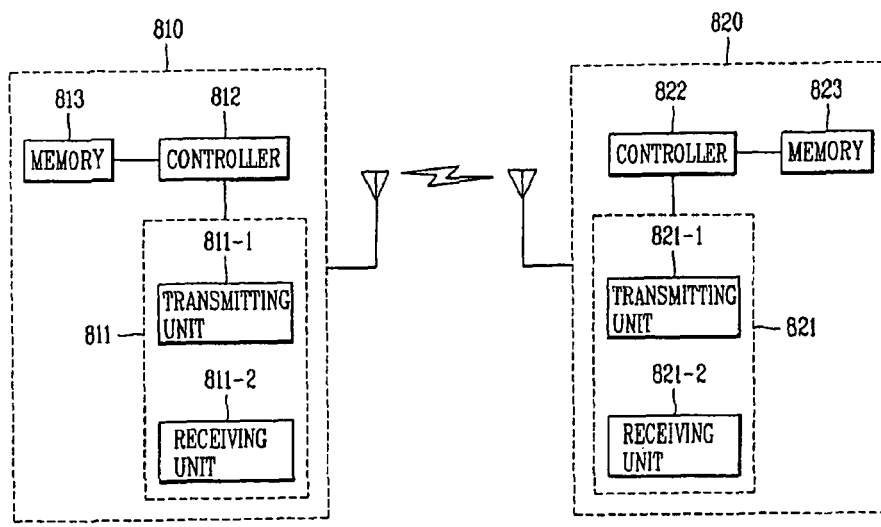
FIG. 8 is a block diagram illustrating an example of a terminal and a base station according to another embodiment of the present invention.

FIG. 8 is a block diagram illustrating an example of a terminal 810 and a base station 820 according to another embodiment of the present invention.

Referring to FIG. 8, the left side represents the terminal 810 and the right side represents the base station 820. The terminal and base station may include an antenna, a controller 812, 822, a transmission (Tx) module 811-1, 821-1, a receiving (Rx) module 811-2, 821-2, and a memory 813, 823, respectively. Each constituent element may perform the corresponding function to each other. Hereinafter, each constituent element will be described in more detail.

The antenna performs a function of transmitting signals generated from the transmission (Tx) module 811-1, 821-1 to the outside or receiving radio signals from the outside to transfer them to the receiving (Rx) module 811-2, 821-2. In case of supporting a multiple-input multiple-output (MIMO) function, two or more antennas may be provided.

The antenna, transmission module and receiving module may constitute a radio frequency (RF) module.

The controller 812, 822 typically controls the overall operation of a mobile station. For example, the controller may perform a controller function for performing the foregoing embodiments of the present invention, a medium access control (MAC) frame variable control function according to service characteristics and radio frequency environments, a handover function, an authentication and encryption function, and the like. More specifically, the controller 812, 822 may perform an overall control for performing the foregoing handover procedure.

In particular, the controller of the mobile station may acquire change count information of the relevant message and system information (namely, SFH information) of the neighbor base station through a neighbor advertisement (AAI_NBR-ADV) message broadcasted from the serving base station.

The controller may determine whether a predetermined handover condition is satisfied, and if the relevant condition is satisfied, then the controller may control a handover request message including the acquired change count information to be transmitted to the serving base station in order to request handover to the serving base station. In case of base station initiated handover, such a procedure may not be carried out.

Subsequently, the terminal may determine whether the terminal itself is in an SFH mismatch state through change count information included in the handover command message received from the serving base station.

Accordingly, the controller may control to receive the latest SFH directly from the target base station through EBB handover or acquire mismatched SFH information through a handover command message. Otherwise, the controller may notify the rejection of handover to the serving base station and update system information of the target base station through the latest version of the neighbor advertisement message to be subsequently received.

A more detailed procedure of the foregoing operation of the controller may perform an overall control operation of the process disclosed in the foregoing embodiments with reference to FIGS. 3 through 7.

The transmission (Tx) module 811-1, 821-1 may perform a predetermined coding and modulation to data scheduled from the controller 812, 822 to be transmitted to the outside and then transfer to the antenna.

The receiving (Rx) module 811-2, 821-2 performs decoding and demodulation to radio signals received from the outside through the antenna to restore the original data format and transfer to the controller 812, 822.

The memory 813, 823 may store a program for processing and controlling the controller 812, 822, and may perform a function for temporarily storing input/output data (for example, system information of the target base station). Furthermore, the memory 813, 823 may include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

On the other hand, in order to perform the foregoing embodiments of the present invention, the base station may perform a controller function, an orthogonal frequency division multiple access (OFDMA) packet scheduling, a time division duplex (TDD) packet scheduling and channel multiplexing function, a medium access control (MAC) frame variable control function according to service characteristics and radio wave environments, high-speed traffic real-time control function, a handover function, an authentication and encryption function, a packet modulation and demodulation function, a high-speed packet channel coding function, a real-time modem control function, and the like, through at least one of the foregoing modules, or may further include a separate means, module or portion for performing such a function.

The present invention may be embodied in other specific forms without departing from the spirit and essential characteristics thereof. The detailed description is, therefore, not to be construed as illustrative in all respects but considered as restrictive.

The scope of the invention should be determined by reasonable interpretation of the appended claims and all changes that come within the equivalent scope of the invention are included in the scope of the invention. In addition, it will be apparent that an embodiment may be configured by a combination of claims cited by each other and a new claim may be included by the amendment after filing the application.

The invention claimed is:

1. A method for updating control information of a target base station by a terminal during a handover procedure, the method comprising:
receiving a handover command message including first change count information representing change count of a neighbor advertisement message from a serving base station;
checking whether the received first change count information is matched to second change count information possessed by the terminal;
transmitting, to the serving base station, a handover indication message including an event code indicating a cancel of handover requested by the serving base station when the received first change count information is not matched to the second change count information, the handover indication message further including indication information which indicates a mismatch of change count information; and
receiving a first message from the serving base station, the first message including latest control information.

2. The method of claim 1, wherein the control information is a superframe header.

3. The method of claim 1, wherein the first message is a neighbor advertisement message.

4. The method of claim 1, further comprising updating control information possessed by the terminal based on the latest control information.

5. The method of claim 4, further comprising:
transmitting a ranging request message to the target base station using the updated control information; and
receiving a ranging response message from the target base station.

6. A terminal for updating control information of a target base station during a handover procedure, the terminal configured to:
receive a handover command message including first change count information representing a change count of a neighbor advertisement message from a serving base station;
check whether the received first change count information is matched to second change count information possessed by the terminal; and
transmit, to the serving base station, a handover indication message including an event code indicating a cancel of handover requested by the serving base station when the received first change count information is not matched to the second change count information, the handover indication message further including indication information which indicates a mismatch of change count information; and
receive a first message from the serving base station, the first message including latest control information.

7. The terminal of claim 6, wherein the control information is a superframe header.

8. The terminal of claim 6, wherein the first message is a neighbor advertisement message.

9. The terminal of claim 6, wherein the terminal is further configured to update control information possessed by the terminal based on the latest control information.

10. The terminal of claim 9, wherein the terminal is further configured to:
transmit a ranging request message to the target base station using the updated control information; and
receive a ranging response message from the target base station.

* * * * *